United States Patent [19]

Harris, Jr. et al.

[11] Patent Number: 5,666,491

[45] Date of Patent: Sep. 9, 1997

[54] PORTABLE NETWORK ADAPTER FOR PORTABLE COMPUTER

[76] Inventors: George W. Harris, Jr., 327 View St., Mountain View, Calif. 94041; Shari J. Nolan, 3470 Pinnacle Dr., San Jose, Calif. 95132; James M. Dougherty, 225 E. Mt. Diablo Ave., Tracy, Calif. 95376

[21] Appl. No.: 620,739

[22] Filed: Mar. 18, 1996

Related U.S. Application Data

[63] Continuation of Ser. No. 47,507, Apr. 12, 1993, abandoned.

[51] Int. Cl.⁶ .................................................. G06F 13/60
[52] U.S. Cl. ............................................................. 395/802
[58] Field of Search .............................. 395/800, 200.02, 395/200.2; 361/683, 686

[56] References Cited

U.S. PATENT DOCUMENTS

| | | | |
|---|---|---|---|
| 4,858,162 | 8/1989 | Kieffer et al. | 361/683 |
| 5,123,092 | 6/1992 | Buxton et al. | 395/250 |
| 5,290,178 | 3/1994 | Ma | 432/652 |
| 5,299,322 | 3/1994 | Arai et al. | 395/275 |
| 5,331,509 | 7/1994 | Kikiwis | 361/686 |
| 5,347,425 | 9/1994 | Herron et al. | 361/683 |
| 5,408,669 | 4/1995 | Stewart et al. | 395/750 |
| 5,457,785 | 10/1995 | Kikiwis et al. | 395/308 |
| 5,463,742 | 10/1995 | Kobayashi | 395/281 |

OTHER PUBLICATIONS

Microsoft Press, "Computer Dictionary", 2nd Ed (1994) pp. 11, 154 & 155, 218.

Black, Uyless D., "Data Communications, Networks and Distributed Processing", Reston Publishing Co (1983) (p. 269).

*Primary Examiner*—Mehmet B. Geckil

[57] ABSTRACT

Disclosed is a portable adapter unit for coupling a small portable computer to a computer network which comprises a network coupling/signal processing circuit, an input connector for one-step connection to such a computer and an output connector for connection to the network, this adapter unit being sufficiently small and light-weight to be transported and used, off-site, with such a portable computer.

10 Claims, 10 Drawing Sheets

PORTABLE NETWORK ADAPTER FOR PORTABLE COMPUTER

This application is a continuation of application Ser. No. 08/047,507, filed Apr. 12, 1993 now abandoned.

This case involves a portable adapter unit facilitating one-motion connection of a portable computer to a network and to peripherals, etc.

BACKGROUND, FEATURES:

The fastest growing segment in the PC computer industry is portable computing, including portables (15–20 lbs.), laptops (8–14 lbs), and notebooks (<8 lbs). The portable segment is growing at an annual rate of 30–35%, compared to the 5–10% growth rate of desktop computers (measured in units). With 1990 revenue of $10B, the portable computing industry is expected to exceed $30B by 1994.

PC users want portability to allow use (extend access) beyond their home office to customer sites, to other office sites, and to their homes; e.g. a laptop allows users to gather data from customer sites and other remote locations and later integrate it into the home office computers (e.g. network). Also, data can be taken from a home office cluster to be presented to customers in outside sales efforts and to remote office workgroups. Further, managers and MIS/DP personnel can conveniently take work home, and remotely tie into the home office via modem, without purchasing two computers and having to deal with transferring information between them.

In general, users favor a portable PC to use as a general-purpose platform that can function equally well as a desktop workstation (e.g. in a cluster network) or as a portable offsite unit. Customers usually disfavor purchasing both a portable computer and a desktop computer for every user; rather, they want one system to function in both roles.

Portable computers present special design demands: they must be of rugged, durable construction; also they must be sufficiently small, compact and light weight to enable their being readily carried, held and manipulated for lap-top use. Also, due their portable nature, one must recognize that the computer will be employed in locations presenting diverse positional requirements and operational demands that must be accommodated. Further, it is desirable that such apparatus be sufficiently versatile to be used also as a desk top apparatus. Consequently, the apparatus must be readily convertible from one form to the other.

It is to the attainment of these objectives, therefore, to which the present invention is directed.

Thus, a need is recognized for a relatively simple portable adapter unit to allow quick, plug-in connection of a portable PC to a network (eg. CTOS network).

Accordingly, it is an object hereof to address at least some of the foregoing needs and to provide one or several of the foregoing, and other, solutions. A more particular object is to provide a portable network adapter for a P.C. Another object is to provide a "mini-dock adapter" which is relatively simple and inexpensive to implement.

BRIEF DESCRIPTION OF THE DRAWINGS

These and other features and advantages of the present invention will be appreciated by workers as they become better understood by reference to the following detailed description of the present preferred embodiments which should be considered in conjunction with the accompanying drawings, wherein like reference symbols denote like elements.

"Net Port" Adapter embodiment

Figure 1:
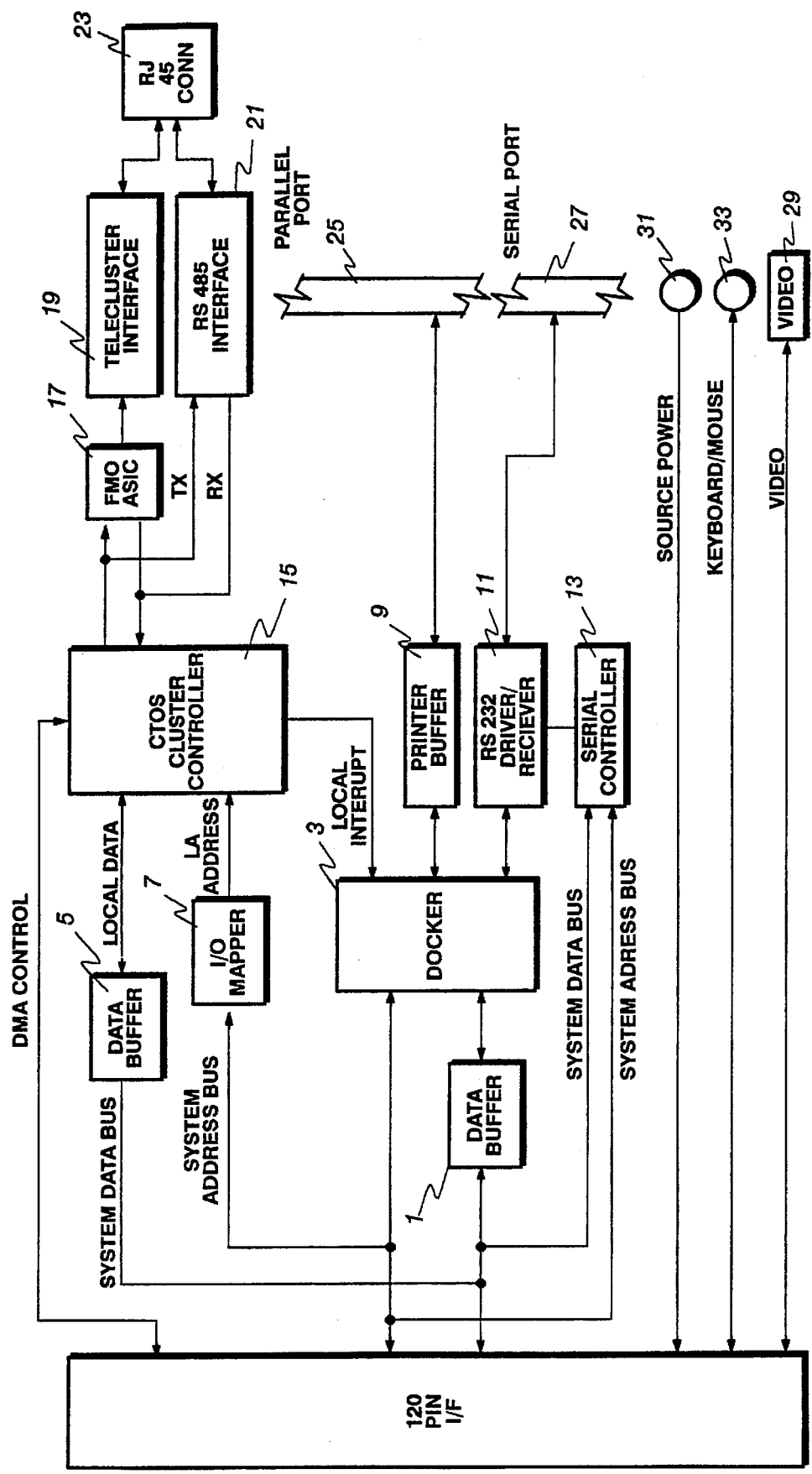
FIG. 1, is a block diagram of a portable network adapter embodiment, adapted according to the invention to couple a portable PC (personal computer) to a (CTOS) network.

FIG. 1 depicts a portable "Net Port" Adapter A in block diagram form. It should be understood that Adapter A allows a user to plug-in his portable PC (eg. a Notebook CP) and be automatically connectible to a CTOS network in the locale. Adapter A preferably comprises a single printed circuit board with circuitry to tie-in the network, while also regenerating the ports of this PC (eg. serial, parallel, printer, disk, display, keyboard/mouse.) Its circuitry (details in FIGS. 2A–2J) will also include the required buffering and logic to allow the adapter to be inserted and operated from the PC power supply.

Assuming that this Notebook (or other PC) may serve as a Desktop PC, but has no capability for coupling into a CTOS network (as we do here), a prime function of Adapter A will be to enable such (eg. assume Adapter A is arranged to mate with the ISA connections from Notebook). This may be done both at the user's home-office, and at remote office-network sites (in some cases replacing a docking station), both Notebook and Adapter A being very light and portable.

And since Adapter A would be expected to obstruct (at least some of) the Notebook's other ports (eg. Serial, Parallel, Mouse-Keyboard, Video-monitor), it replicates these ports itself. (e.g., so a modem may be connected via Serial Port—indeed much in the fashion of a conventional Docking Station—Thus, Adapter A may be characterized as a "mini-docking station.") Note that, like a Docking Station, Adapter A can retain connectors to all the usual Notebook ports, yet allow one to coupled/uncouple everything from the Notebook in one, quick clip-on operation.

But, unlike a Docking Station, Adapter A must be fed power from its Notebook PC (which itself will likely be powered either by its battery, or from line-power AC, which it converts to DC).

Thus "Net Port" Adapter A is a portable "mini-docking" solution. It contains no ISA support, but has complete (cluster) network functionality, preferably along with the following features:

Include circuitry to regenerate:
One Serial Port
One Parallel Port, Enhanced Parallel Port (EPP)
Pass-through connector ports for:
VGA port
Standard Keyboard Port
External battery charger port
Circuitry to generate the Cluster Network functionality That is, the design preferably comprises a single PCB with circuitry to regenerate the Serial Port and 'Enhanced Parallel Port' interfaces, while passing-through video, keyboard, and power, and will also include the required circuitry to support a CTOS "Cluster Network".

This design presents interfaces to serial/parallel peripherals, such as a printer, floppy or hard disk, modem.

Portable adapter A can serve as the interface between a portable PC (e.g., "N-Notebook", which is plugged into it) and a CTOS network, plus an array of peripheral connections, such as VGA, keyboard, mouse, ext. battery, (but no ISA). Thus, Adapter A will be understood to plug into a portable PC (Notebook) at 120-pin interface I/F, (FIG. 1) and to include the following sections: a network connection stage NN, controlled via a Cluster Controller stage 15 and associated buffer 5 and mapper 7, plus an array of Serial/Parallel peripheral ports 25, 27 input via a docker stage 3 and associated buffer 1, and a serial controller 13.

As noted, Adapter A can be viewed as a mini-docking station that—unlike a conventional docking station,—is light and portable (e.g. ½ to 1 pound, about 2"×2"×8" vs. a 10 to 15 lb. docking station that may be 12–15"×3–4"× 6–8"), is powered off its PC (e.g. not line-power, no conversion of line AC) and that has no drive-bays or ISA-slots (instead, Notebook supports one or several PCMCIA slots).

FIG. 1 is block diagram functionally interrelating salient elements of the preferred adapter A implemented as a single PC card AC. Card AC preferably forms the entirety of the adapter circuitry, on a single board.

Interface I/F is arranged to plug-into a like receptacle of N-Notebook, being coupled to input the pair of data buffers (or latches) 1, 5, to input Cluster Controller 15 (see "DMA control" signals for direct memory access, requesting the PC to Write-in/Read-from main memory to buffer FIFO register at Controller 15), to input a Serial Controller 13, (via data bus and address bus) and to a Docker (I/O control) unit 3 (FPGA to chip select, at 15, I/O control voltage), as well as to input source power (Terminal 31), keyboard/mouse (Terminal 33) and video (display, See Terminal 29.)

The Docker stage 3 also, preferably, is also adapted to feed address/data signals to a Printer (via Printer Buffer 9 and Parallel Port 25) and to a Driver stage (RS-232 Driver/Receiver 11, Serial Port 27). Stage 3 preferably comprises a field programmable gate array (FPGA) that receives all input signals (from I/F), decodes address signals and generates "chip-select" signals. Docker 3 thus controls stage 15 to an extent, as well as affording I/O control.

Serial Controller 13 receives parallel address/data signals and converts these to serial signals, applied to RS-232 Driver Receiver 11. And, "system address" signals are applied from I/F to, CTOS I/O Mapper 7 to map CTOS networking addresses for Controller 15. Serial port 27 is used to communicate with serial-operated equipment.

"Local interrupt" signals are fed between Docker 3 and Controller 15 to the Notebook PC.

Workers will recognize that Adapter A may be used somewhat like a docking station, while involving lower cost, less mass (volume, weight) and portability. Adapter A is apt for tying such a portable (Notebook) PC to an integrated local area network (LAN, e.g., CTOS Cluster), and for one-shot plug-in of the PC to associated peripherals. It also can free-up "PCMCIA slots" on the PC (e.g., assume two on Notebook) for other uses.

Adapter A, unlike a docking station, has no drive bay and no ISA slots (e.g., needs none, has integrated network; though it can use ISA bus for ISA peripherals). Adapter A must use a remote source (e.g., pref. local disk) for input of the operating system (no Boot ROM for this).

Figure 2A:
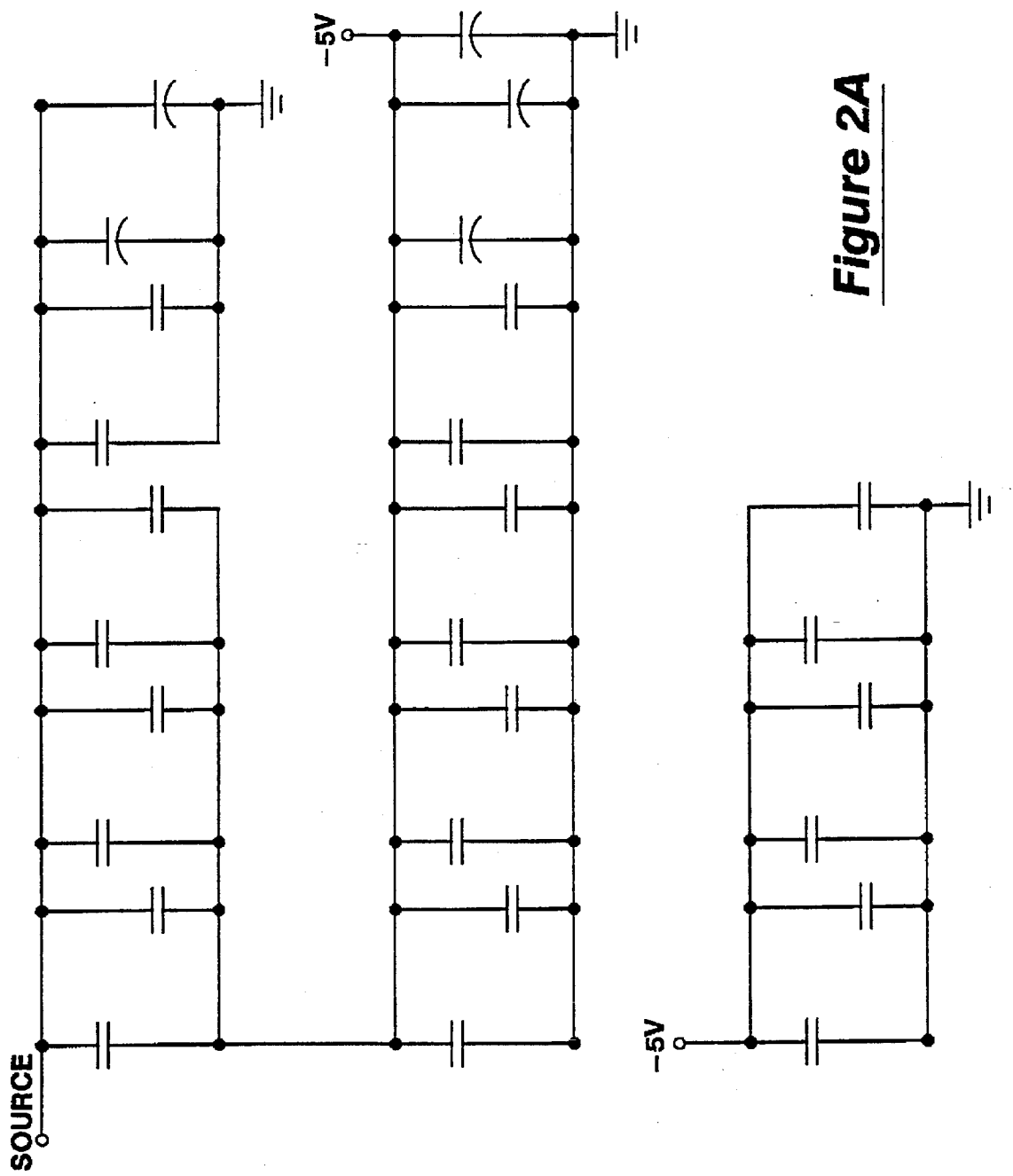
FIGS. 2A–2J give preferred circuit implementation of the block diagram of FIG. 1.
Figure 2B:
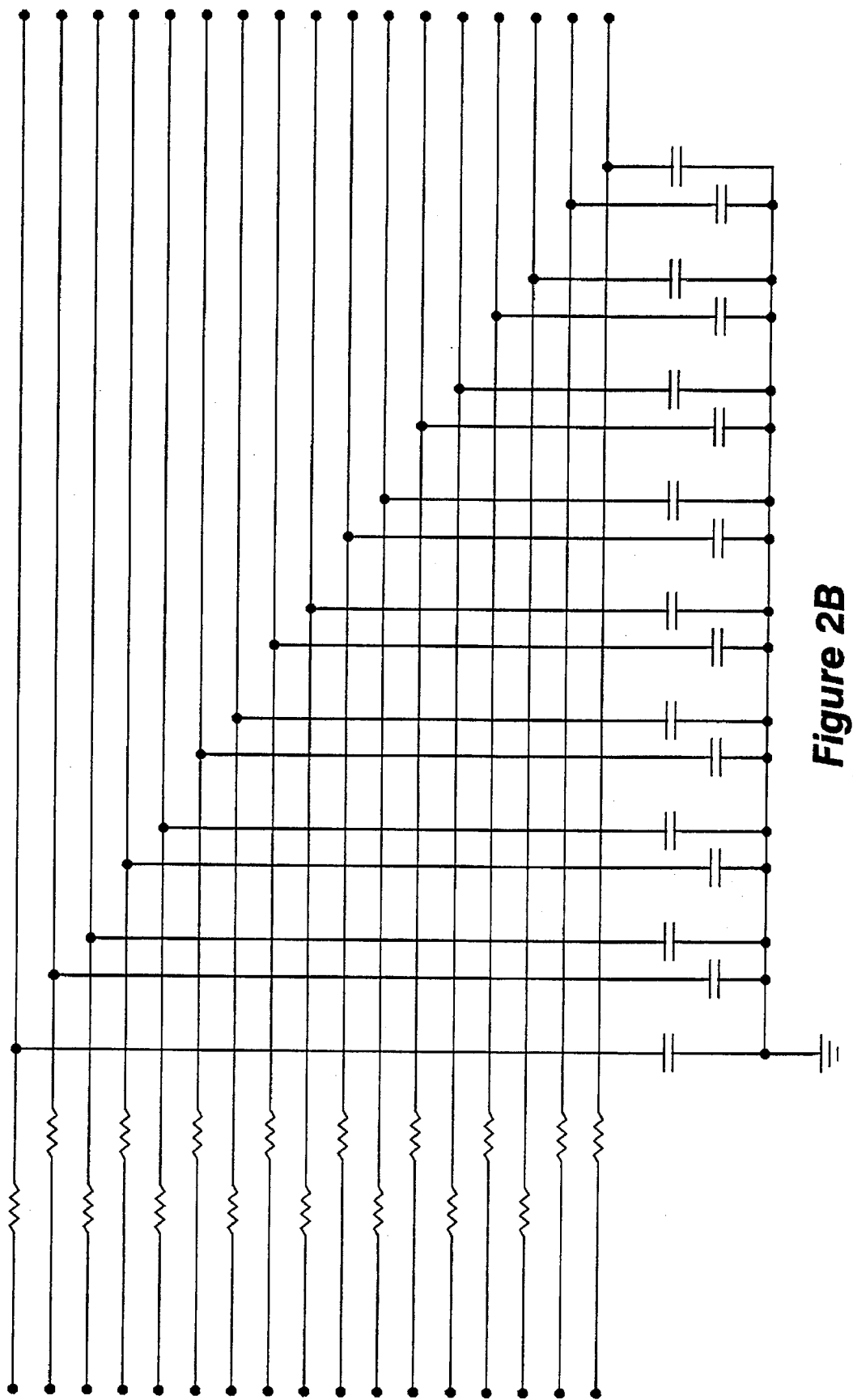
Figures 2C, 2D:
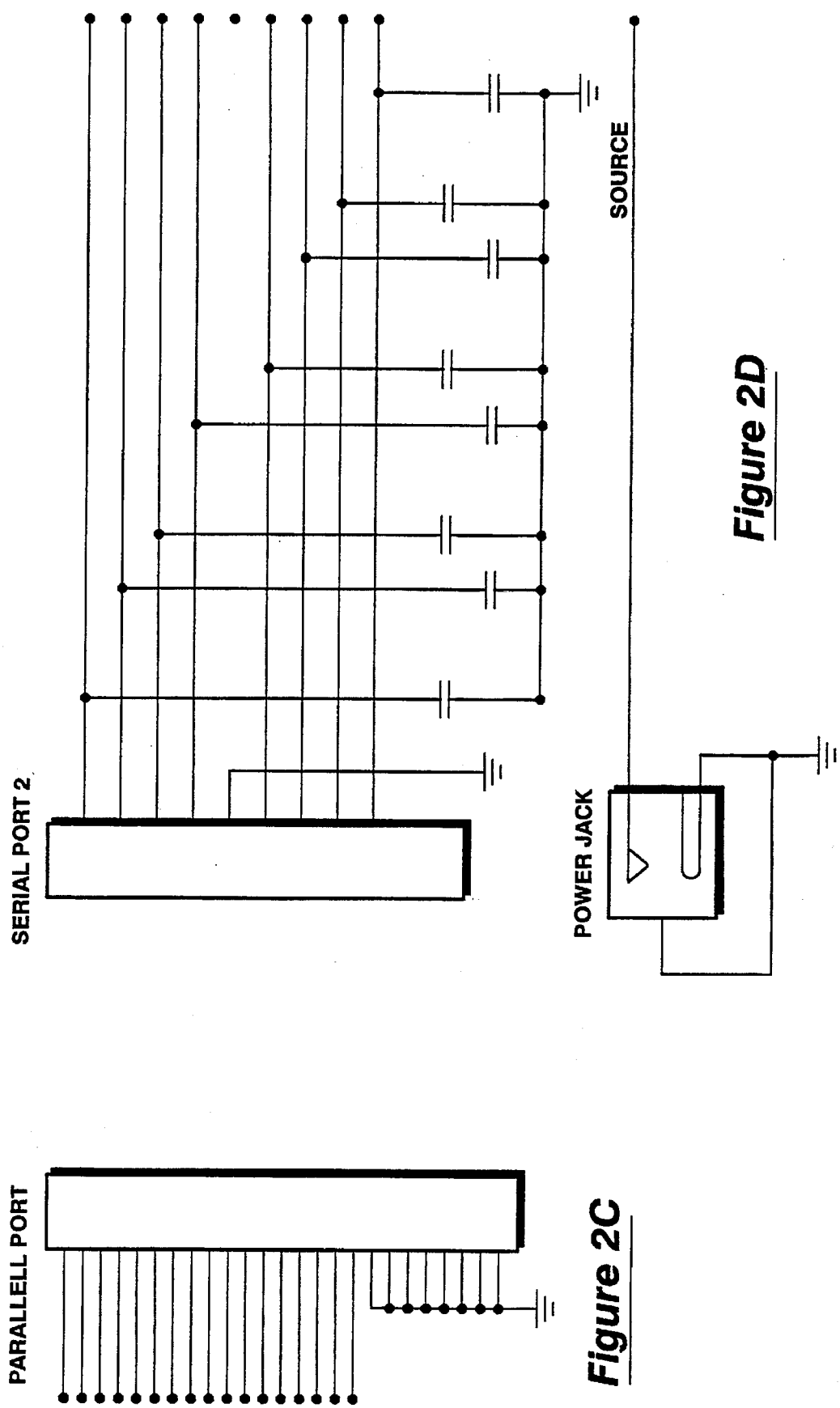
Figure 2E:
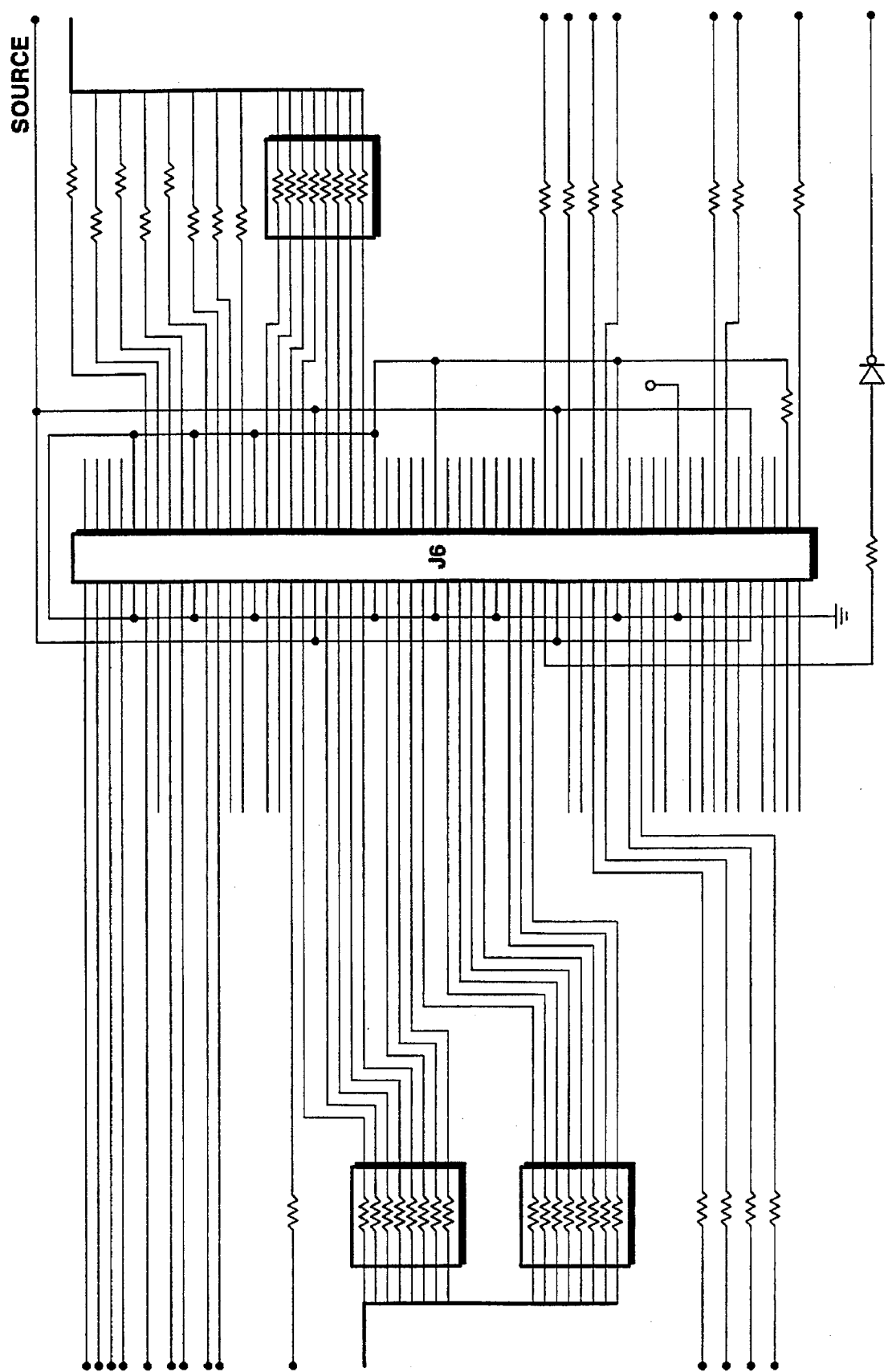
Figure 2F:
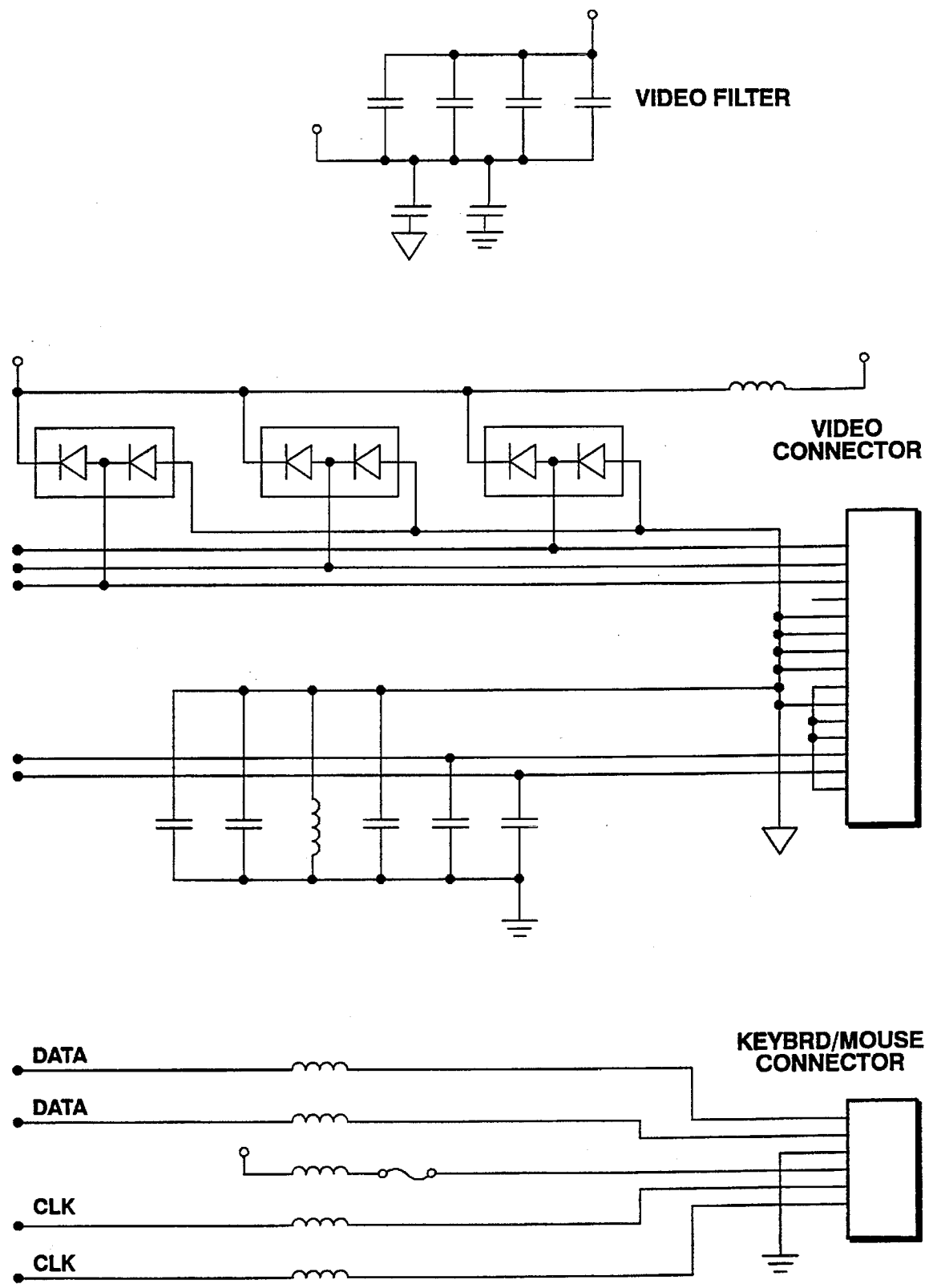
Figure 2G:
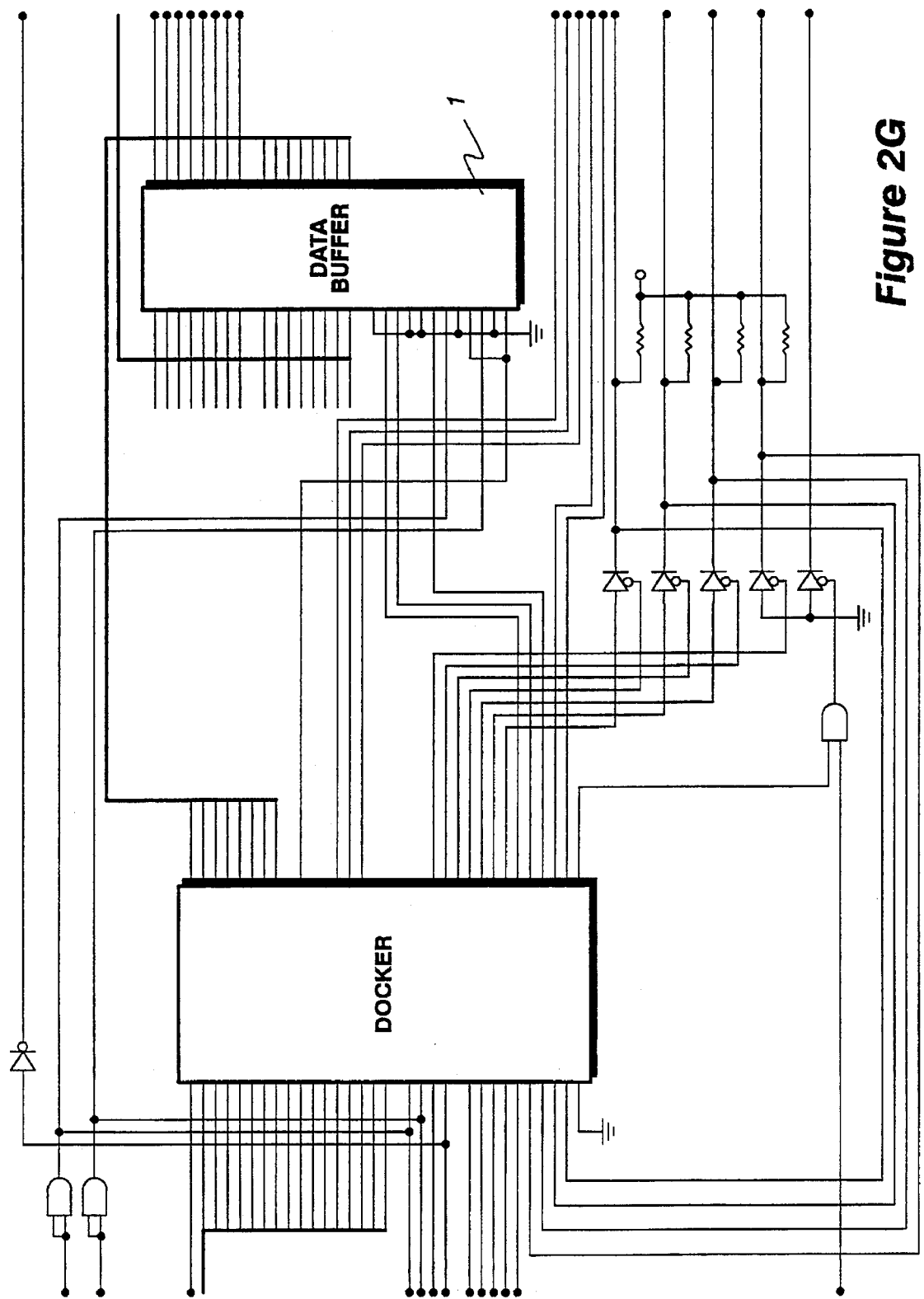
Figure 2H:
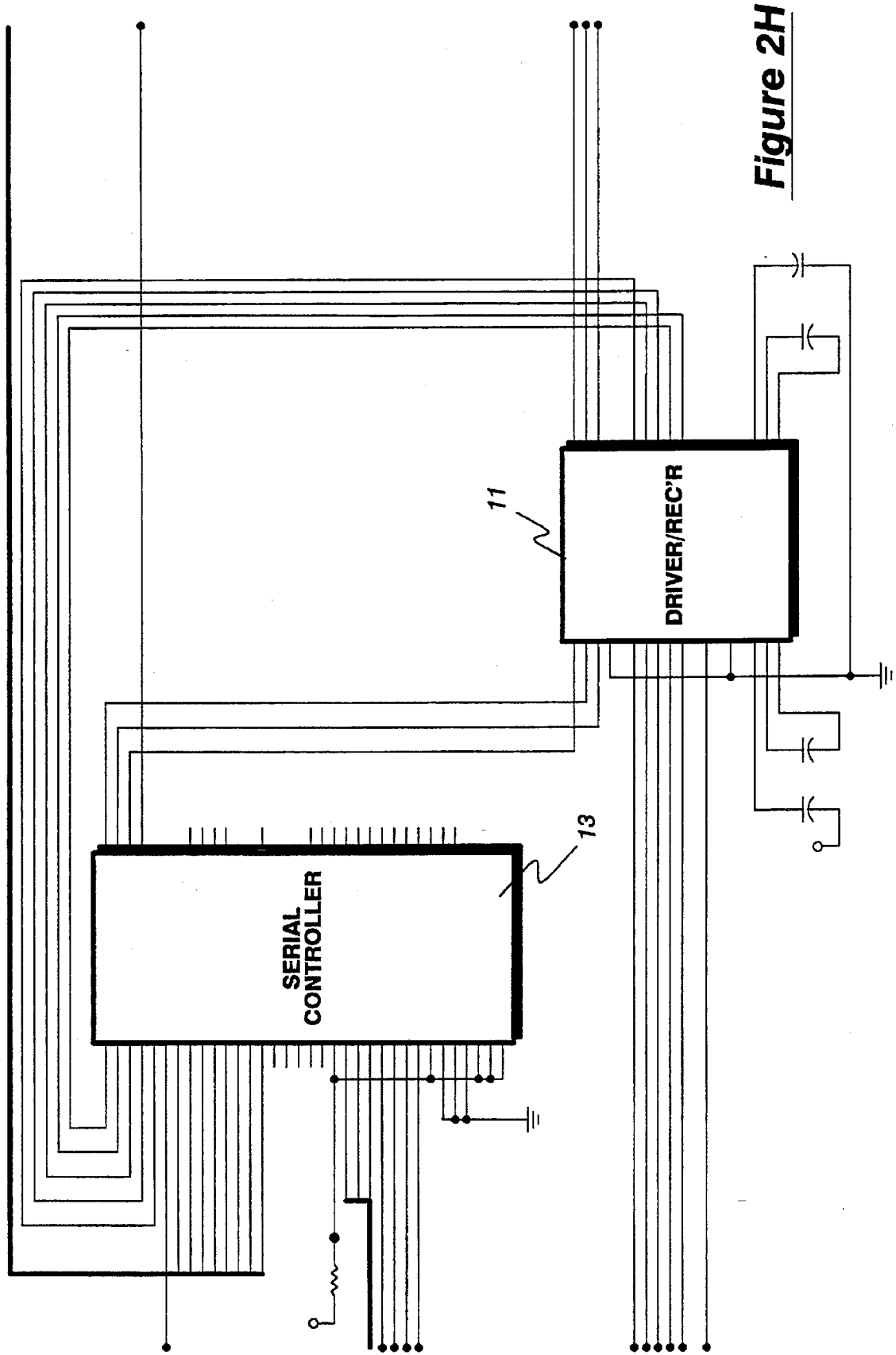
Figure 2:
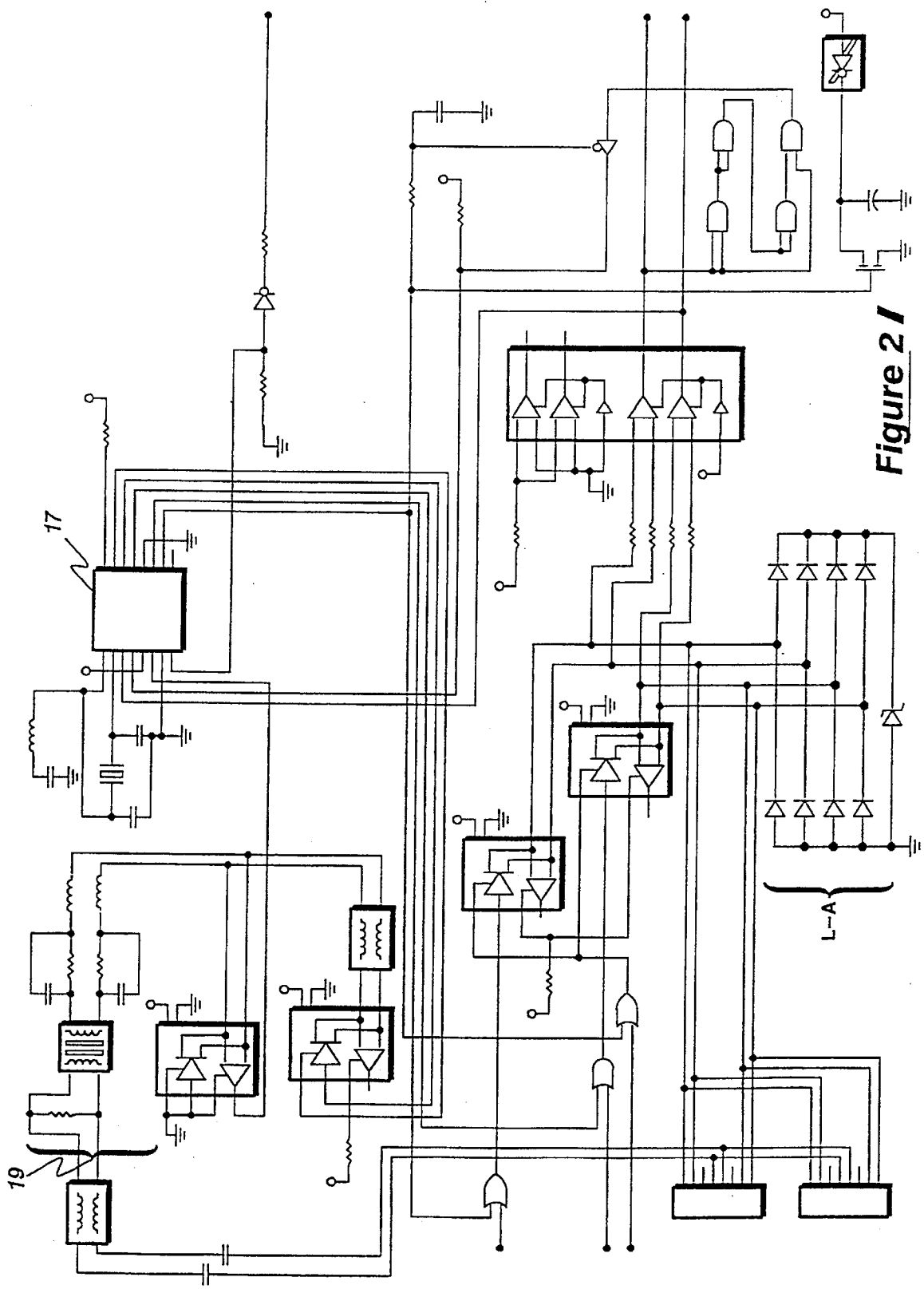
Figure 2J:
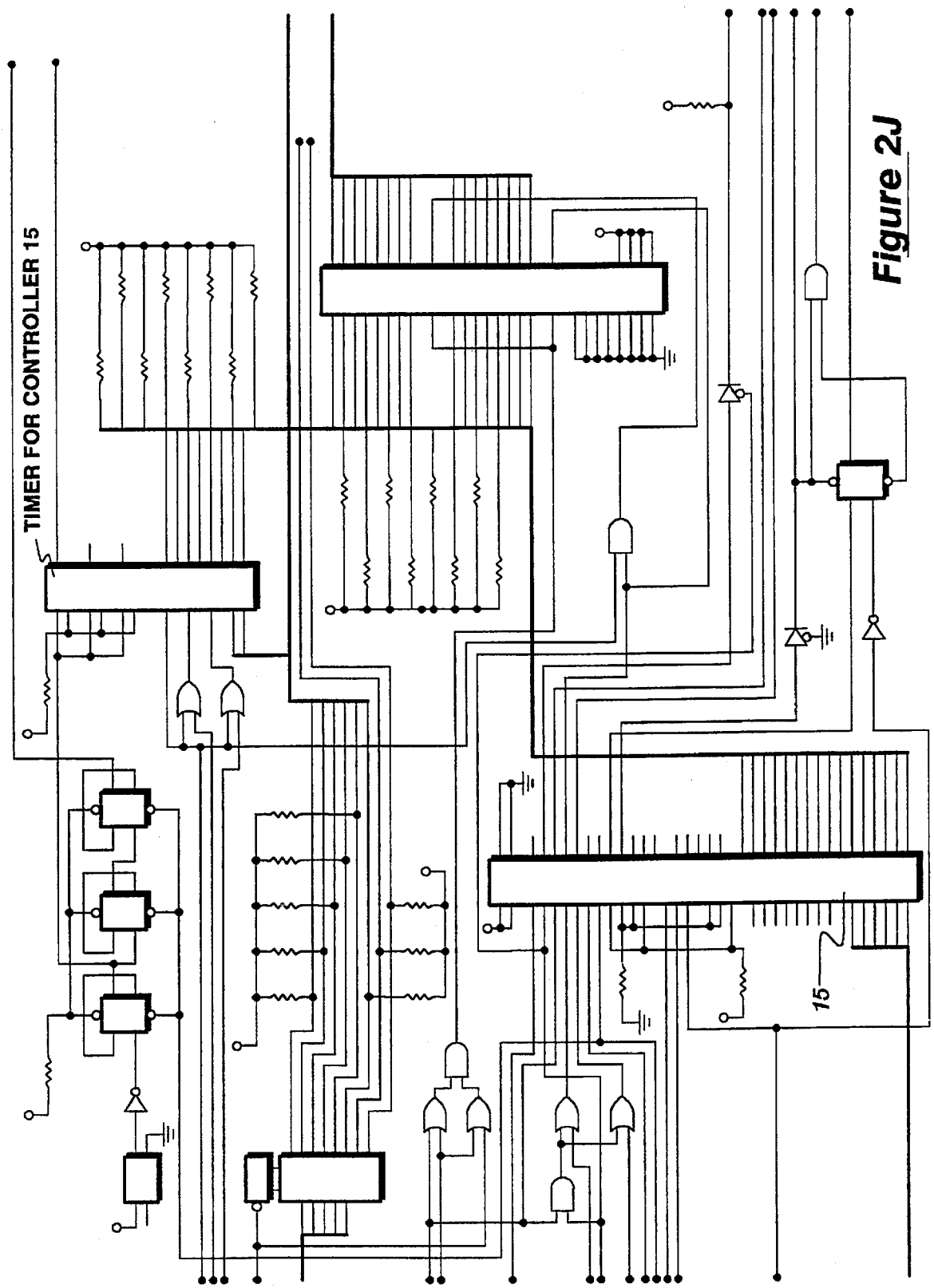

Output from I/F and from Data Buffer 5 (local data via System data bus) and Mapper 7 (LA address via System address bus) are applied to operate CTOS Cluster Controller stage 15 (chip U-5, FIG. 2J).

CTOS I/O Mapper block 7 will be understood to receive conventional address-inputs (along System address bus) and organize them in the usual way to map memory and apply a mapped address output to CTOS Cluster Controller stage 15, where the parallel inputs are converted to serial output (clock and data) for transmission over a network (twisted pair lines via 17, 19 e.g., within an office suite; or Grey cable via 21).

An FMO stage 17 (ASIC chip) preprocesses these signals for transmission over twisted pair lines (e.g., to encode, transmit clock and data into an "FMO format").

TeleCluster UTP Interface 19 is input from stage 17 and functions to filter-out noise and to pulse-shape signals before such transmission over the "unshielded twisted pair, (UTP) at RJ 45 connector 23.

Stage 21 is the RS 485 interface ("Gray cable") and functions to interface the CTOS Cluster Controller 15 to shielded "multi-drop Gray cable", at RJ 45 connector 23.

This arrangement can be used in several types of environments such as RS485 Cluster, "TeleCluster", (of Unisys Corp) or a mixed environment. Depending on the connection desired, there will be different cable assemblies to make the unit compatible with existing products as well as new products.

There are two RJ45 shielded connectors (jacks) at 23. Both jacks accept 1-pair, 2-pair, 3-pair, or 4-pair, RJ45/RJ11 type plugs. For each connector, the two center conductors are used for connection to "TeleCluster"; while the outer pins are used for RS485 signals.

This Adapter card AC may be connected, via local in-house telephone wiring, to a Hub (e.g. in a "Telecluster"; max. distance: 1200 feet at 307 Kb/1.8 Mb, 800 feet at 3.7 Mb rate).

Operation:

This Adapter Card AC is characterized by three main operations: initialization, transmit mode, and receive mode. Once card AC has been initialized, it will assume either transmit mode or receive mode.

INITIALIZATION:

Board AC is initialized on "power up", or "system reset". Then the I/O addresses are determined (see system BIOS); next, the Interrupt and DMA (direct memory access) channels are determined.

RECEIVE MODE:

Before serial data can be received, the CPU must set up the system to be in "receive mode". First, the Parameter Control Register (PCR) and the Address Register (AR) of the Cluster Controller chip 15 (FIGS. 1, 2J) are initialized. Then, activation of the Receive Enable (RXE) and DMA Receive Enable (DMARXE) signals set the data path and the internal FIFO of Chip 15 for "receive mode". The data on Receiver Serial Input (RXSI) is shifted in on the rising edge of the Receiver Clock signal (RXC). The hardware will then receive data and transfer it into memory.

An interrupt will occur when the DMA is completed, or if any errors occur during the receive cycle. When the last DMA cycle is completed, "External End of Cycle" (XEOP) AND "DMA Acknowledge" (DACK, see chip D-C also) are issued to the Controller Chip 15; in turn, the Communications Interrupt Line (COMMINTR) is asserted (to DMA chip D-C, FIG. 2A), signifying "end-of-transmission". Then, "Receive Enable" (RXE) and "DMA Receive Enable" (DMARXE) should be de-asserted (RX: net signals, input to card AC).

TRANSMIT MODE:

Transmitting is like "receiving-in-reverse", except that, in addition to moving the data to be transmitted, the DMA Manager must write some of the bits into the transmit control register (inside chip 15). First, the Parameter Control Register (PCR) of the Controller chip 15 is initialized, and the external DMA Controller is set up to fill DMA (from memory) with the characters to be transmitted.

Then, activation of the "Transmit Enable" (TXE) and "DMA Transmit Enable" (DMATXE) signals set the data path and the internal FIFO of the Controller Chip 15 for "transmit mode". The Transmit Data Buffer (TXDB) should be loaded with the first character of the message. Each character is serialized in the Transmitter Shift Register (TXSR, within Controller chip) and transmitted on occurrence of "Transmit Serial OUT" (TXSO).

After the last character has been loaded into the TXDB and sent to the TXSR, "Transmit End of Message" (TEOM) is set. When the DMA Controller has counted-down, an internal "End of Process" (EOP) signal will be generated, and in turn the Communications Interrupt Line (COMMINTR) will be asserted, signifying "end-of-transmission" (at DMA chip D-C)_. Then "Transmit Enable" (TXE) and "DMA Transmit Enable" (DMATXE) should be de-asserted.

Circuits, FIGS. 2A–2J:

FIGS. 2A, 2B, etc. give preferred circuit implementation of salient aspects of "Adapter Card" AC described above. FIG. 2A is a capacitive anti-noise filter circuit. FIG. 2B shows signal Termination, FIGS. 2C, 2D depict the parallel and serial I/O ports and power jack I/O interfaces; FIG. 2E shows the interface I/F (to Notebook bus; see Pin connector J6). FIG. 2F shows a videofilter, and connectors (video, keyboard/mouse). FIG. 2G shows docker stage 3, (see chip U1) and associated bidirectional data buffer 1 (chip U2) and bi-directional IN/OUT connections, FIG. 2H shows Serial Controller 13; (chip U12) together with Receiver/Driver stage 11 (chip U4); FIG. 2J shows Cluster Controller stage 15 (chip U5) and associated timer (chip U9); and FIG. 2I shows analog circuits, including Telecluster stage 19 (interface to UTP, or unshielded twisted pair), RJ45 jacks J1, J3 and associated interface, Grey-cable input, lightening arrestor stage L-A, and FMO Asic 17. (see chip U14).

It will be understood that the preferred embodiments described herein are only exemplary, and that the invention is capable of many modifications and variations in construction, arrangement and use without departing from the spirit of the invention.

Since modifications of the invention are possible, for example, the means and methods disclosed herein are also applicable to other portable computers, to other portable network adapter arrangements, and to other related systems. The present invention is also applicable for enhancing other related CTOS network arrangements.

The above examples of possible variations of the present invention are merely illustrative. Accordingly, the present invention is to be considered as including all possible modifications and variations coming within the scope of the invention as defined by the appended claims.

What is claimed is:

1. A portable adapter unit for coupling a small portable computer to a computer CTOS-type network comprising a network-coupling/signal processing stage including CTOS Cluster Controller means, along with CTOS I/O mapper means for address input to said Controller means; input connector means for one-step connection to such a computer and output connector means for connection at least to said network, this adapter unit being sufficiently small and light-weight to be transported with such a computer; and wherein said processing stage also includes "twisted pair" output means and cable output means; said "twisted pair output means" including ASIC" means together with "Telecluster interface" means.

2. The adapter unit of claim 1, wherein pin-connector interface means is provided to couple with associated connector means on said portable computer, and is arranged to input all said processing stage; and wherein said pin-connector interface means is also adapted to output signals to Source Power, to keyboard/mouse connector means and to video display connector means.

3. A portable adapter unit for coupling a small portable computer to a computer network (e.g., via 23, FIG. 1) comprising network coupling/signal processing circuit means including Cluster Controller means (15 FIG. 1), input connector means (I/F) for one-step plug-in connection to such a computer, plus output connector means (17, 19, 21, 23) for connection at least to said network, this adapter unit being sufficiently small and light-weight to be transported with such a computer;

said Cluster Controller means (15) coupled to be input by I/O mapper means (7) for address input;

wherein Docker means (3) and associated Data Buffer input means (1) thereto are coupled to said Controller means (15); and wherein Data Buffer means (5) is also coupled directly to said Controller means (15) to input "local data" signals thereto.

4. The adapter unit of claim 3, wherein Parallel Port means (25) and Serial Port means (27) are output from said Docker means (3), with Driver/Receiver means (11) included in said Serial Port means; and wherein Serial Controller means (13) is also input to said Driver/Receiver means (11).

5. The adapter unit of claim 3, wherein said circuit means also includes "twisted pair" output means and "Grey cable" output means; said "twisted pair output means" including "FMO-ASIC" means together with "Telecluster UTP interface" means.

6. The adapter unit of claim 5, wherein said "cable output means" includes "interface" means and data/clock lines thereto.

7. The adapter unit of claim 6, wherein said output means are both coupled, in parallel, to connector means.

8. The adapter unit of claim 5, wherein address bus means and data bus means are input to said Serial Controller means.

9. The adapter unit of claim 8, wherein said circuit means also includes "twister pair" output means and "cable" output means, and wherein said "twisted pair output means" includes "ASIC" means together with "Telecluster interface" means.

10. The adapter unit of claim 3, wherein pin-connector interface means is provided to couple with associated connector means on said portable computer, and is arranged to input all said circuit means.

* * * * *